A. C. & R. W. SRIVER.
Harvester Reel and Dropper.
No. 216,706. Patented June 17, 1879.
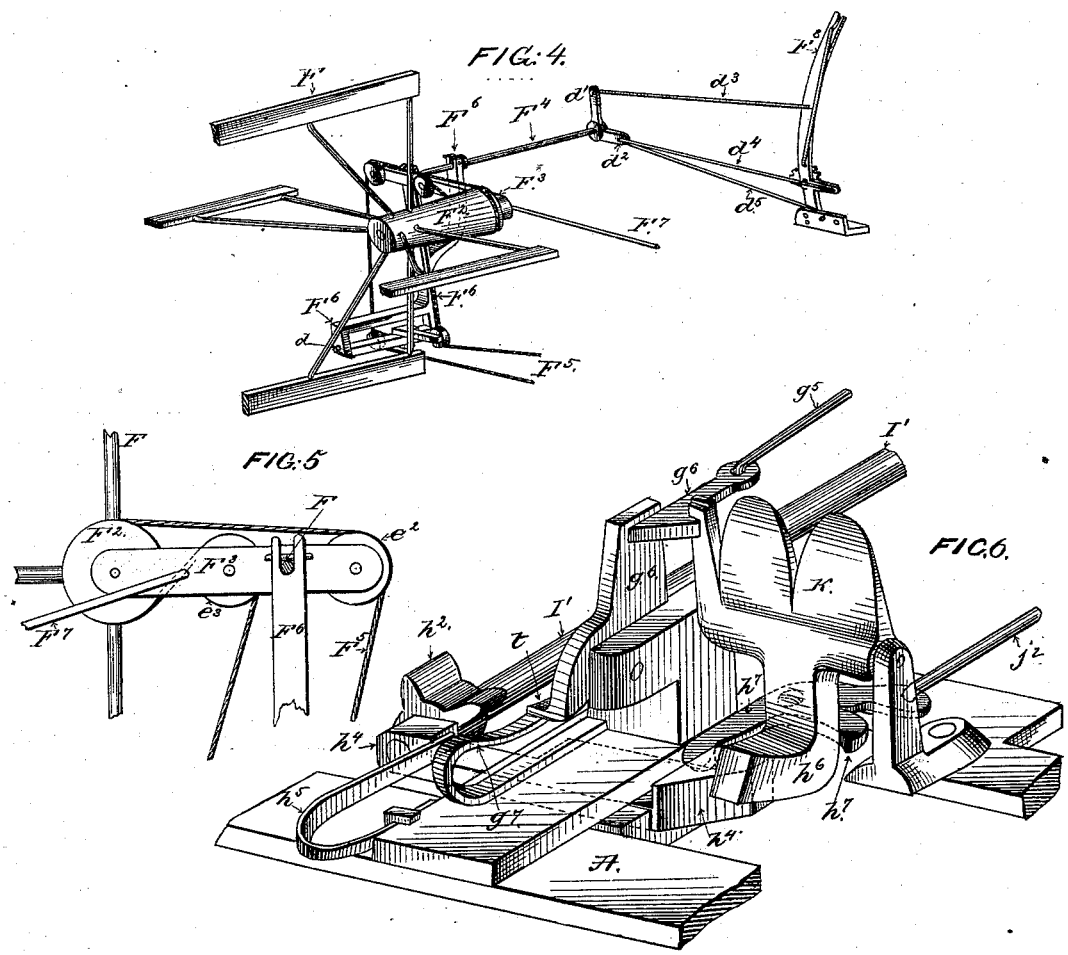

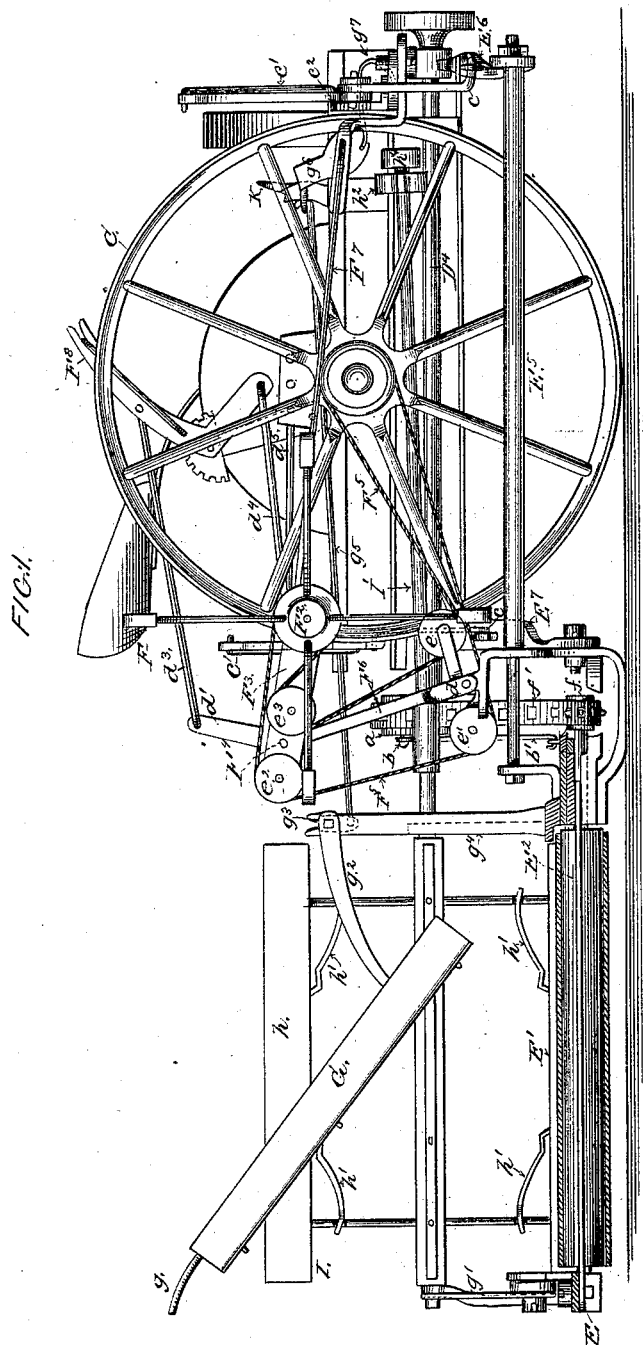

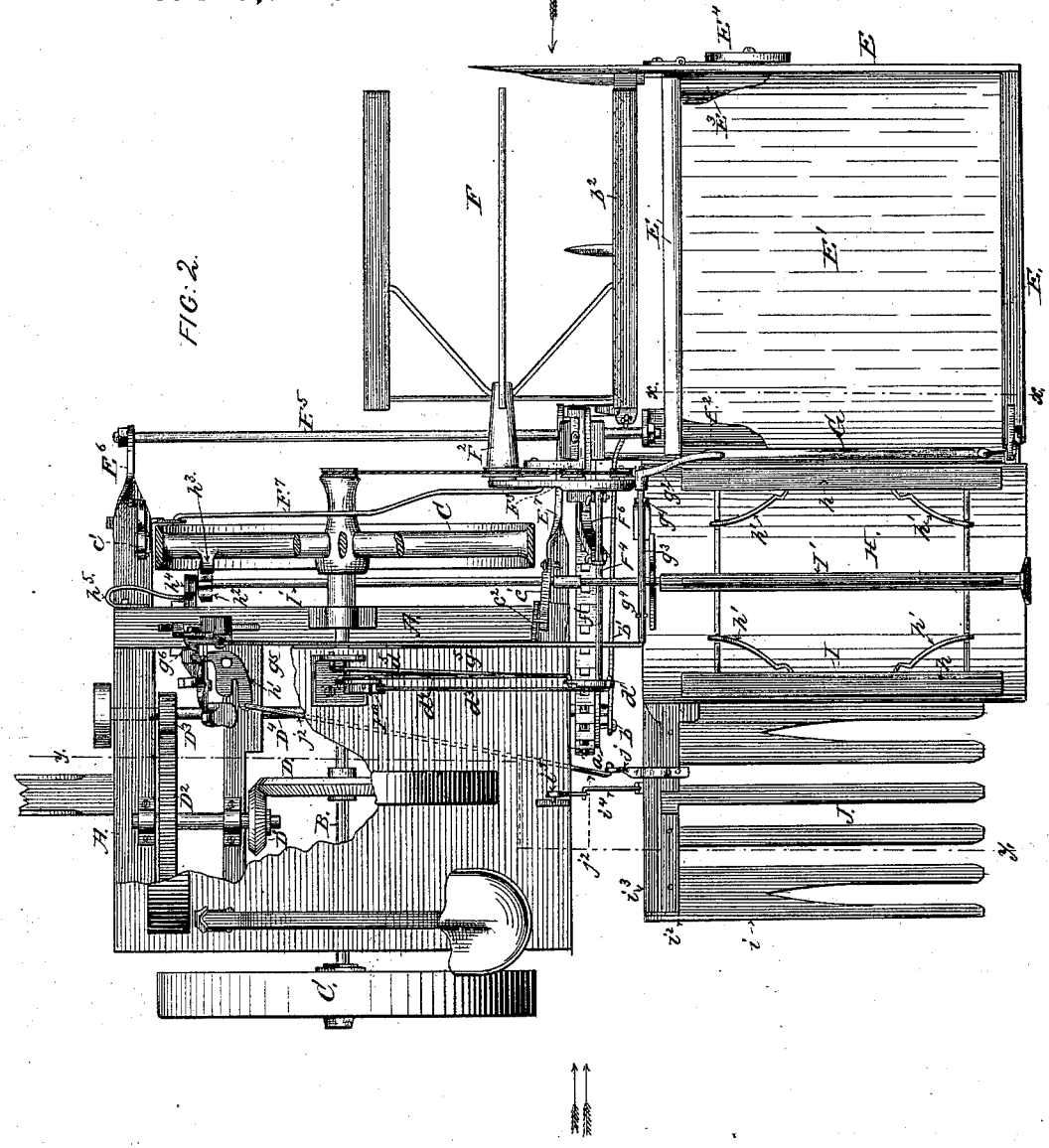

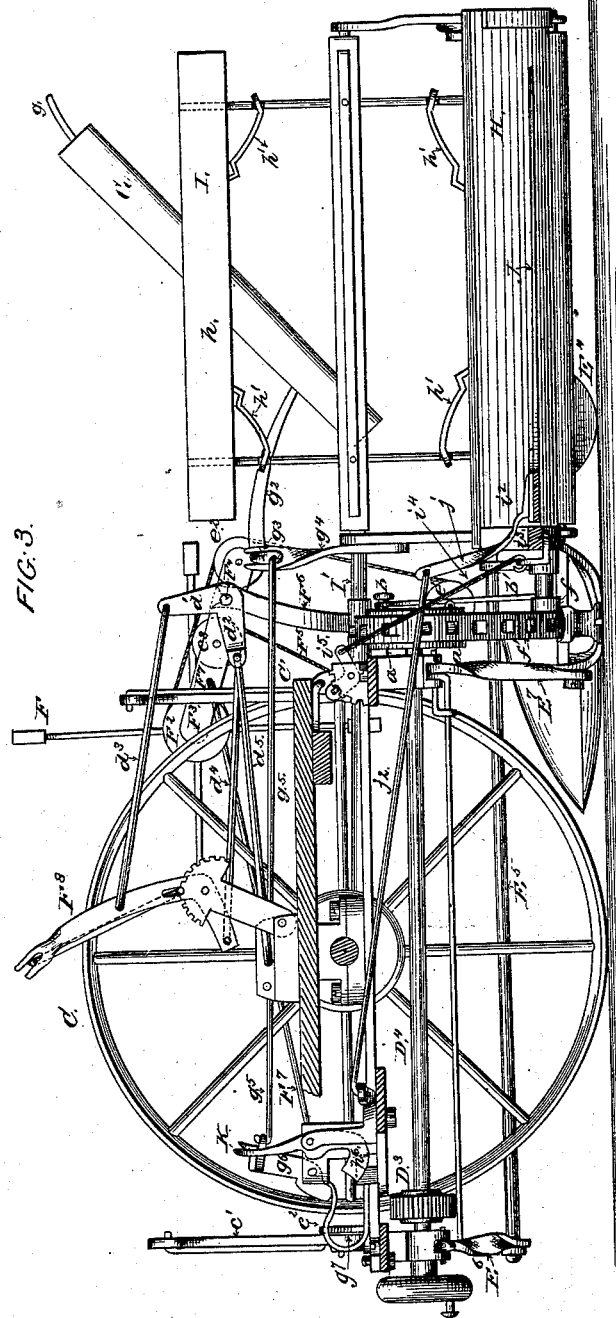

UNITED STATES PATENT OFFICE.

ARTHUR C. SRIVER AND REUBEN W. SRIVER, OF NEW BALTIMORE, OHIO.

IMPROVEMENT IN HARVESTER REEL AND DROPPER.

Specification forming part of Letters Patent No. 216,706, dated June 17, 1879; application filed April 15, 1879.

*To all whom it may concern:*

Be it known that we, ARTHUR CARNES SRIVER and REUBEN WISE SRIVER, of New Baltimore, in the county of Stark and State of Ohio, have invented a new and Improved Combined Reaper and Dropper; and we do hereby declare that the following is a full, clear, and exact description of the same, reference being had to the accompanying drawings, forming part of this specification, in which—

Figure 1 is a side view with the platform in vertical section through line $x\ x$, Fig. 2, looking in the direction of the arrow. Fig. 2 is a plan view with a part of the driver's platform and a part of the endless apron forming the grain-platform broken away. Fig. 3 is a vertical section through the line $y\ y$, Fig. 2, looking in the direction of the double arrow. Fig. 4 is a perspective view of the devices for adjusting the reel. Fig. 5 is a view of a portion of the same devices from the other side. Fig. 6 is a perspective of the treadle-connections as operated by the driver's foot.

Our invention relates to a novel construction and arrangement of parts for constituting a combined reaper and dropper adapted to cut the grain, to divide the same into gavels, and drop such gavels.

The principal features of our invention consist in the improved means for regulating the vertical adjustment of the reel above the cutter-bar, and in the peculiar means for rendering the discharge of the cut grain intermittent, together with devices for controlling the action of the parts, as hereinafter fully described.

In the drawings, A, Fig. 2, represents a rectangular frame, arranged beneath the driver's platform, and provided with bearings which contain the main shaft B, supported at its ends upon the two running wheels C C. On this shaft is a bevel-wheel, D, meshing with a bevel-pinion, $D^1$, at right angles, which pinion is fixed upon a shaft carrying the gear-wheel $D^2$, and which latter engages with a pinion, $D^3$, on a longitudinal shaft, $D^4$. This shaft $D^4$ extends to the rear of the frame A, and is there provided with a chain-wheel, $a$, and a wrist-pin, $b$, which latter in its revolution imparts through the pitman $b^1$ the necessary reciprocating motion for the cutter-bar $b^2$.

E is the platform-frame, having an apron or web, $E^1$, distended around rollers $E^2\ E^3$, and moving transversely to the line of draft. This apron and frame constitute together the platform, which is supported at its outer side by the wheel $E^4$, and at its inner side by the drag-bar $E^5$, which drag-bar is swung from arms $E^6\ E^7$, which arms are pivoted beneath the driver's platform to the bearings of the longitudinal shaft $D^4$, and are adjusted vertically to regulate the height of the cutter-bar by means of the two lift-rods $c\ c$, Fig. 1, attached to elbow-levers $c^1\ c^1$, which latter are located upon the frame A, and are provided with detents that engage with curved and notched plates $c^2\ c^2$ to hold the parts to their adjustment.

F is the reel, which consists of a series of horizontal arms affixed by radial spokes at one end to a grooved hub, $F^2$. This hub is arranged upon an axis projecting from a crank-arm, $F^3$, Figs. 4 and 5, affixed to a rock-shaft, $F^4$, and is rotated by a belt, $F^5$, passing around a pulley on the hub of the adjacent main wheel C.

Now, in adjusting the reel vertically above the cutter-bar it will be seen that if it moves upon the crank-arm $F^3$ about the rock-shaft $F^4$ as a center, (see Figs. 1, 4, and 5,) the line of adjustment described by the reel will be the arc of a circle, which causes the said reel in some parts of its adjustment to be thrown out of the vertical line of the cutter-bar, which is objectionable.

To obviate this and cause the adjustment of the reel to be always in, or nearly in, the same vertical plane, we arrange the rock-shaft $F^4$ (carrying the reel) in bearings in a forked and tilting frame, $F^6$, pivoted at its lower end, at $d$, Figs. 1 and 4, to a support attached to the drag-bar. Connecting to the crank-arm $F^3$ is also a rod, $F^7$, Figs. 2, 4, and 5, which extends forward past the wheel, and is attached to an extension of the main frame A, Fig. 2. To the opposite end of the rock-shaft from the reel is attached an elbow-lever, $d^1\ d^2$, Figs. 3 and 4, from the upper arm, $d^1$, of which a rod, $d^3$, extends to a hand-lever, $F^8$, and from the lower arm, $d^2$, of which a rod, $d^4$, extends to the elbow or lower end of said hand-lever $F^6$. A rod, $d^5$, also extends from the lower arm, $d^2$, of the elbow-lever to the base-plate of lever $F^6$, which is a fixed part. This hand-lever $F^6$ is also provided with the customary detent and notched bar to hold it to its position.

Now, in adjusting the reel vertically, the rod $d^5$ and arm $d^2$ of the elbow-lever form together one set of toggle-arms, and the rod $F^7$ and crank-arm $F^3$ form together another set of toggle-arms, so that when the lever $F^6$ is deflected the rock-shaft $F^4$ is both turned on its axis and is moved sidewise, so as to cause the tilting frame to rock on its lower bearing. The result of this movement is that the reel-axis has a movement somewhat similar to the movement of the center pivot of a set of toggle-arms, which gives an adjustment for the reel in a plane which is nearly always in a vertical line with the cutter-bar.

In connecting the hub $F^2$ of the reel with the hub of the nearer drive-wheels C, by the belt $F^5$, the latter is passed first around the fixed guide-pulleys $e$ $e^1$, and thence around guide-pulleys $e^2$ $e^3$ mounted on the arm $F^3$. To reduce the slack in this belt due to the changes in the adjustment, the pulleys $e$ $e^1$ should be fixed as close as possible to the pivotal point $d$, and the pulleys $e^2$ $e^3$ should also be placed as closely as possible to the pivotal point $F^4$.

The construction and arrangement of the dropping devices will now be described. The apron $E^1$ is made to travel transversely to the line of draft in the rear of the cutter-bar from the rotation of roller $E^2$, which is driven by a chain-wheel, $f$, and chain $f'$, by the chain-wheel $a$ upon the rear end of the longitudinal shaft $D^4$. The grain which is cut falls upon said apron, and is carried by it against cut-off bar G, (when the latter is down,) which, at the proper time, is raised, and the gavel delivered upon the curved trough H. The cut-off then again descends to separate the gavel from the grain still pressing inward, and while down a reel, I, forces the gavel in the trough onto a dropper, J, which drops it, the cut-off being then again raised for a repetition of the operation.

All of these parts are arranged to operate in conjunction with each other, and their said operation is under the immediate control of the driver. Before describing their joint operation, however, it is best for the sake of clearness to describe their individual means of operation.

The cut-off bar or rake G is provided at its free end with an extension, $g$, Fig. 1, which, when the bar is down, rests against the side of a stud, $g^1$, on the platform, to brace said cut-off and prevent it from being strained out of position (when down) by the pressing of the grain against the same. The said cut-off is fixed to the crank-arm $g^2$ of a rock-shaft, $g^3$, which latter is held in bearings in the top of the standards $g^4$ $g^4$, and is operated through a rod, $g^5$, attached to a crank at the other end of the shaft. This rod $g^5$ extends forward to the front end of the machine, where it is attached to a catch, $g^6$, against which the treadle K is made to engage to exercise a traction or draft on said rod $g^5$ when pushed forward, and over the inclined face of which catch the treadle is moved backward. The catch $g^6$ $g^6$ is pivoted to an extension from the main frame, so as to oscillate in the same frame with the treadle, and is held constantly to the rear by the tension of a spring, $g^7$, Figs. 1, 3, and 6. This spring is arranged not in the plane of the pivot of the catch, but beneath an offset, $t$, therefrom, so that said spring not only produces a backward movement of the rod $g^5$, (which raises the cut-off bar,) but, with a certain degree of looseness at its pivot, it furnishes a sufficient elastic side movement to allow the treadle to engage with the catch when moved in one direction, (forward,) and thrust it aside for a new hold when moved in the reverse direction.

The dropper-reel I is arranged in bearings above the curved trough H, and its bars $h$ are arranged to slide on the radial spokes, and are backed by springs $h^1$, which render them yielding, so that if they should descend upon a pile of grain they do not break, but yield upon their springs. For driving this reel its shaft I', Figs. 2 and 6, is extended to the front end of the machine, and is provided with a cog-wheel, $h^2$, which is intermittently rotated by the lugs or tappets $h^3$ formed on the drive-wheel C. This end of the shaft bearing the cog-wheel is made laterally adjustable, so that the cog may be either in a position to be operated by the lugs or tappets on the wheel C, or may be out of range therewith. For this purpose this end of the shaft is journaled in a laterally-sliding bar, $h^4$, which is pressed constantly toward the main wheel C by a spring, $h^5$. For withdrawing the cog-wheel from the range of contact with the tappets an extension, $h^6$, Figs. 3 and 6, is formed upon the lower end of the treadle, which normally is at the end of the sliding bar $h^4$, so as to oppose its motion and hold the cog-wheel rigidly in contact with the tappet. Just in the rear of the treadle, and in the range of the movement of the extension $h^6$ therefrom, is an elbow-lever, $h^7$, Figs. 2 and 6, one of whose arms is struck by the extension $h^6$, (as soon as said extension passes from in front of sliding bar $h^4$,) and the other of whose arms rests against a shoulder on slide-bar $h^4$, so that a deflection of the treadle has the effect of removing its lower extension from the end of bar $h^4$, and at the same time withdrawing (through the elbow-lever) the bar $h^4$ and cog-wheel $h^2$ from the range of engagement with the lugs on the wheel.

The dropper J consists of a base slotted so as to form fingers pointing to the rear, and provided with a guard-plate, $i$, Fig. 2, to hold the grain thereupon as received from the trough. This dropper is pivoted at $i^2$ to a frame-bar, $i^3$, which latter is sustained at different heights by a rod, $i^4$, detent-lever $i^5$, and notched plate. This dropper is held in a horizontal position by an arm, $j$, and a rod, $j^2$, which latter extends to the front of the machine, and is there attached to the elbow-lever $h^7$, Figs. 2, 3, and 6. Now, when this elbow-lever is thrown back from the action of the co-operating parts, it will be seen that the rod $j^2$ is thrown to the rear, and the dropper drops upon its pivots $i^2$, so that the stubble projects between the finger-bars and drags off the gavel.

The several parts of the dropping arrangement having been thus specifically described, their combined operation is as follows: The cut-off bar being down upon the platform, the grain, as carried to one side by the endless apron, piles up against the same until a sufficient quantity has accumulated to produce a gavel. At this point the driver presses the treadle past the catch $g^6$, and the rod $g^5$ moves to the rear from the tension of spring $g^7$, raising the cut-off bar. The accumulated grain is then allowed to discharge into the trough until a sufficient quantity for a gavel has passed. The treadle being now brought back, it is pressed forward a given distance, and made to engage with the catch $g^6$ and force the cut-off bar down again. While the cut-off is down the lugs on the wheel C rotate the dropper-reel, causing the charge of grain to be swept over upon the dropper-frame. The driver then forces the treadle farther forward to complete its movement. This last part of the movement of the treadle has, through the elbow-lever $h^7$, a threefold effect. (See Fig. 6.) First, it slackens the tension on the dropper-rod $j^2$, allowing the dropper to fall and discharge the gavel. Secondly, it throws the reel-shaft out of gear with the drive-wheel C; and, thirdly, as the treadle passes catch $g^6$ it allows the spring $g^7$ to raise the cut-off to admit a new supply of grain to the now stationary reel. As soon as the cut-off descends again the reel discharges the grain in the trough to the dropper, the dropper discharges it, and the action is continued so long as the reaper is in action.

Having thus described our invention, what we claim as new is—

1. The combination, with the reel F, of the means for adjusting the same, consisting of the tilting frame $F^6$, the rock-shaft $F^4$, having crank-arm $F^3$, the rod $F^7$, elbow-lever $d^1$ $d^2$, the rods $d^3$ $d^4$ $d^5$, and the hand-lever $F^8$, all arranged substantially as shown and described.

2. The combination, with the hub of the main wheel and the belt $F^5$, of the fixed guide-pulleys $e$ $e^1$, the tilting frame $F^6$, the crank-arm $F^3$, carrying guide-pulleys $e^2$ $e^3$, and the reel-hub $F^2$, substantially as and for the purpose described.

3. The dropping apparatus, consisting of an endless apron, E, a cut-off, G, a trough, H, reel I, and dropper J, combined and arranged substantially as shown and described.

4. The cut-off G, sustained at one end by its operating connection, and combined with the platform, having an upwardly-projecting stud, $g^1$, to re-enforce said bar against strain, as described.

5. The combination, with the cut-off-operating rod $g^5$ and the treadle K, of the tilting frame $g^6$, pivoted to rock vertically, and having a catch for the treadle, and an offset, $t$, together with the spring $g^7$, substantially as and for the purpose described.

6. The reel I, having its shaft $I'$ extended to the front part of the machine, and provided with a cog-wheel, $h^2$, the said forward end being arranged in an adjustable bearing and combined with the drive-wheel C, having tappets $p^3$, as shown and described.

7. The treadle K, having a downward extension, $h^6$, in combination with the elbow-lever $h^7$, the sliding bar $h^4$, the spring $h^5$, the catch $g^6$, and the spring $g^7$, substantially as and for the purpose described.

ARTHUR CARNES SRIVER.
REUBEN WISE SRIVER.

Witnesses:
E. R. ROYER,
EDWARD GLASS.